(12) United States Patent
Peng et al.

(10) Patent No.: US 11,194,182 B2
(45) Date of Patent: Dec. 7, 2021

(54) COLLISION MACHINE FOR SIMULATING COLLISIONS AND METHOD OF SIMULATING COLLISIONS

(71) Applicant: Shenzhen China Star Optoelectronics Technology Co., Ltd., Shenzhen (CN)

(72) Inventors: Bangyin Peng, Shenzhen (CN); Tienchun Huang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 220 days.

(21) Appl. No.: 16/494,302

(22) PCT Filed: Feb. 15, 2019

(86) PCT No.: PCT/CN2019/075234
§ 371 (c)(1),
(2) Date: Sep. 15, 2019

(87) PCT Pub. No.: WO2020/029570
PCT Pub. Date: Feb. 13, 2020

(65) Prior Publication Data
US 2020/0233243 A1   Jul. 23, 2020

(30) Foreign Application Priority Data
Aug. 10, 2018  (CN) .......................... 201810909920.3

(51) Int. Cl.
*G02F 1/13* (2006.01)
*G01N 3/38* (2006.01)

(52) U.S. Cl.
CPC ............. *G02F 1/1309* (2013.01); *G01N 3/38* (2013.01); *G02F 1/1303* (2013.01)

(58) Field of Classification Search
CPC .... G01N 3/32; G01N 3/38; G01N 2203/0005; G01N 2203/005; G01N 2203/0051; G01F 1/1303; G01F 1/1306; G01F 1/1309
See application file for complete search history.

(56) References Cited

U.S. PATENT DOCUMENTS

2015/0153592 A1   6/2015   Huang

FOREIGN PATENT DOCUMENTS

| CN | 101067689 | 11/2007 |
|----|-----------|---------|
| CN | 103345081 | 10/2013 |

(Continued)

OTHER PUBLICATIONS

Huang et al., CN 107390397, Nov. 2017, WIPO Computer Translation (Year: 2017).*

*Primary Examiner* — Erika J Villaluna

(57) ABSTRACT

A collision machine for simulating collisions and a method of simulating collisions. The collision machine includes at least two collision units, each of the collision units comprising a housing, support structures, and at least two collision bodies. The support structures are located on two opposite surfaces of the housing for fixing a liquid crystal panel. The collision bodies are located below the support structures, and top surfaces of the collision bodies are in contact with a display surface of the liquid crystal panel for applying repeated impacts to the liquid crystal panel to generate bubbles in the liquid crystal panel by the repeated impacts. Each the collision bodies comprises a closed casing, a collision body located inside the casing, and a driving device for generating the repeated impacts.

20 Claims, 2 Drawing Sheets

(56) References Cited

FOREIGN PATENT DOCUMENTS

| | | | |
|---|---|---|---|
| CN | 107219652 | | 9/2017 |
| CN | 107390397 A | * | 11/2017 |
| KR | 10-2013-0136806 | | 12/2013 |

* cited by examiner

COLLISION MACHINE FOR SIMULATING COLLISIONS AND METHOD OF SIMULATING COLLISIONS

RELATED APPLICATIONS

This application is a National Phase of PCT Patent Application No. PCT/CN2019/075234 having International filing date of Feb. 15, 2019, which claims the benefit of priority of Chinese Patent Application No. 201810909920.3 filed on Aug. 10, 2018. The contents of the above applications are all incorporated by reference as if fully set forth herein in their entirety.

FIELD AND BACKGROUND OF THE INVENTION

The present invention relates to the field of display technologies, and in particular, to a collision machine for simulating collisions and a method of simulating collisions.

Thin film transistor liquid crystal displays have advantages of being thin and light, environmentally friendly, fast response times, and good display effects, and have been widely used in the field of electronic display. The main component of a thin film transistor liquid crystal display is a liquid crystal cell composed of a thin film transistor substrate, liquid crystals, and a color filter substrate. In order to avoid a phenomenon that the liquid crystal cell is uneven in thickness under influence of external pressure, a plurality of support columns usually disposed between the thin film transistor substrate and the color filter substrate, so that the thickness of the liquid crystal cell remains unchanged. However, when the liquid crystal display is pressed and bumped by an external force, the support columns will crush conductive glass at the bottom of the liquid crystal cell. The rupture of the conductive glass causes the gas in a color resist layer to escape, creating bubbles in a display screen. Therefore, before the display screens are shipped, a simulated impact test is required to measure the tolerance of the display screens to external impacts and the display screens will be optimized according to results of the test.

Therefore, there is a need for a method and an apparatus that can simulate impacts to display screens.

SUMMARY OF THE INVENTION

The present application provides a collision machine for simulating collisions and a method of simulating collisions to simulate impacts to a display.

The present application provides a collision machine for simulating collisions, comprising at least two collision units, each of the collision units comprising a housing, support structures and at least two collision bodies; wherein the support structures are located on two opposite surfaces of the housing for fixing a liquid crystal panel; the collision bodies are located below the support structures, and top surfaces of the collision bodies are in contact with a display surface of the liquid crystal panel for applying repeated impacts to the liquid crystal panel to generate bubbles in the liquid crystal panel by the repeated impacts; each of the collision bodies comprises a closed casing, a collision body located inside the casing, and a driving device for generating the repeated impacts.

According to one aspect of the application, the housing is a cubic structure having a cavity, the cubic structure has an opening in a vertical surface thereof, a movable cover corresponding to the opening is disposed at the opening, and wherein the surface of the cubic structure in a horizontal direction is a detecting surface, and a length and a width of the detecting surface are greater than a length and a width of the liquid crystal panel.

According to one aspect of the application, two opposite surfaces of the cubic structure perpendicular to the opening and the detecting surface are supporting surfaces for setting the support structures; the support structures are double-layered protrusion structures symmetrically disposed on each of the supporting surfaces, the distance between a top protrusion and a bottom protrusion of the double-layered protrusion structure is equal to the thickness of the liquid crystal panel.

According to one aspect of the application, each of the collision bodies comprises a closed casing, a collision body located inside the casing, and a driving device for generating the repeated impacts.

According to one aspect of the application, the driving device is an ultrasonic generator.

According to one aspect of the application, the ultrasonic generator is located at a bottom of the casing and is capable of accepting a collision signal emitted by the collision machine, and wherein after receiving the collision signal, the ultrasonic generator emits ultrasonic waves, and the collision bodies are driven upward by ultrasonic waves to strike a top of the casing.

According to one aspect of the application, the ultrasonic waves have a periodically repeating frequency capable of driving the collision bodies to periodically reciprocate in a vertical direction, causing the collision body to periodically repeatedly strike the top of the casing.

According to one aspect of the application, the collision body is a magnetic collision body and the drive device is a magnetic field generator.

According to one aspect of the application, the magnetic field generator is a toroidal coil distributed on the top, bottom and side walls of the casing, the magnetic collision body is located inside the toroidal coil, and the magnetic field generator is capable of accepting a collision signal emitted by the collision machine, and wherein after receiving the collision signal, the magnetic field generator generates a certain frequency of alternating current inside the toroidal coil to form a magnetic field inside the coil, and the collision body is driven upward by the magnetic field to strike the top of the casing.

According to one aspect of the application, the magnetic field generated by the magnetic field generator has a periodically changing magnetic field direction, the change in the direction of the magnetic field drives the magnetic collision body to periodically reciprocate in a vertical direction, causing the collision body to periodically and repeatedly strike the top of the casing.

The present application further provides a collision machine for simulating collisions, comprising at least two collision units, the collision units comprising a housing, support structures and at least two collision bodies; wherein the support structures are located on two opposite surfaces of the housing for fixing a liquid crystal panel; the collision bodies are located below the support structures, and top surfaces of the collision bodies are in contact with a display surface of the liquid crystal panel for applying repeated impacts to the liquid crystal panel to generate bubbles in the liquid crystal panel by the repeated impacts.

According to one aspect of the application, the housing is a cubic structure having a cavity, the cubic structure has an opening in a vertical surface thereof, a movable cover corresponding to the opening is disposed at the opening, and wherein the surface of the cubic structure in a horizontal direction is a detecting surface, and a length and a width of the detecting surface are greater than a length and a width of the liquid crystal panel, respectively.

According to one aspect of the application, two opposite surfaces of the cubic structure perpendicular to the opening and the detecting surface are supporting surfaces for setting the support structures; the support structures are double-layered protrusion structures symmetrically disposed on each of the supporting surfaces, a distance between a top protrusion and a bottom protrusion of the double-layered protrusion structure is equal to a thickness of the liquid crystal panel.

According to one aspect of the application, each of the collision bodies comprises a closed casing, a collision body located inside the casing, and a driving device for generating the repeated impacts.

According to one aspect of the application, the driving device is an ultrasonic generator.

According to one aspect of the application, the ultrasonic generator is located at a bottom of the casing and is capable of accepting a collision signal emitted by the collision machine, and wherein after receiving the collision signal, the ultrasonic generator emits ultrasonic waves, and the collision bodies are driven upward by ultrasonic waves to strike a top of the casing.

According to one aspect of the application, the ultrasonic waves have a periodically repeating frequency capable of driving the collision bodies to periodically reciprocate in a vertical direction, causing the collision body to periodically repeatedly strike the top of the casing.

According to one aspect of the application, the collision body is a magnetic collision body and the drive device is a magnetic field generator.

According to one aspect of the application, the magnetic field generator is a toroidal coil distributed on the top, bottom and side walls of the casing, the magnetic collision body is located inside the toroidal coil, and the magnetic field generator is capable of accepting a collision signal emitted by the collision machine, and wherein after receiving the collision signal, the magnetic field generator generates a certain frequency of alternating current inside the toroidal coil to form a magnetic field inside the coil, and the collision body is driven upward by the magnetic field to strike the top of the casing.

According to one aspect of the application, the magnetic field generated by the magnetic field generator has a periodically changing magnetic field direction, the change in the direction of the magnetic field drives the magnetic collision body to periodically reciprocate in a vertical direction, causing the collision body to periodically and repeatedly strike the top of the casing.

The present application further provides a method of simulating collision, comprising the steps of:

S1, providing a collision machine, the collision machine comprising at least two collision units, the collision units comprising a housing, support structures and at least two collision bodies; wherein the support structures are located on two opposite surfaces of the housing for fixing a liquid crystal panel, and wherein the collision bodies are located below the support structures, and top surfaces of the collision bodies are in contact with a display surface of the liquid crystal panel;

S2, placing a liquid crystal panel into the housing and fixing the liquid crystal panel by the support structure;

S3. activating the collision bodies to make the collision bodies apply repeated impacts to the liquid crystal panel and generating bubbles in the liquid crystal panel by the repeated impact.

The present application can simulate external impacts by the collision bodies and generate liquid crystal bubbles in the liquid crystal display, so that the impacts test of the liquid crystal panel can be completed before shipping and help the producers evaluate and optimize the quality of the liquid crystal panels according to the results of the impacts test. In addition, the present application provides at least two collision units, which can perform impacts test on two or more panels at the same time, further improving the test efficiency.

BRIEF DESCRIPTION OF THE SEVERAL VIEWS OF THE DRAWINGS

In order to describe clearly the embodiment in the present disclosure or the prior art, the following will introduce the drawings for the embodiment shortly. Obviously, the following description is only a few embodiments, for the common technical personnel in the field it is easy to acquire some other drawings without creative work.

DESCRIPTION OF SPECIFIC EMBODIMENTS OF THE INVENTION

Figure 1:
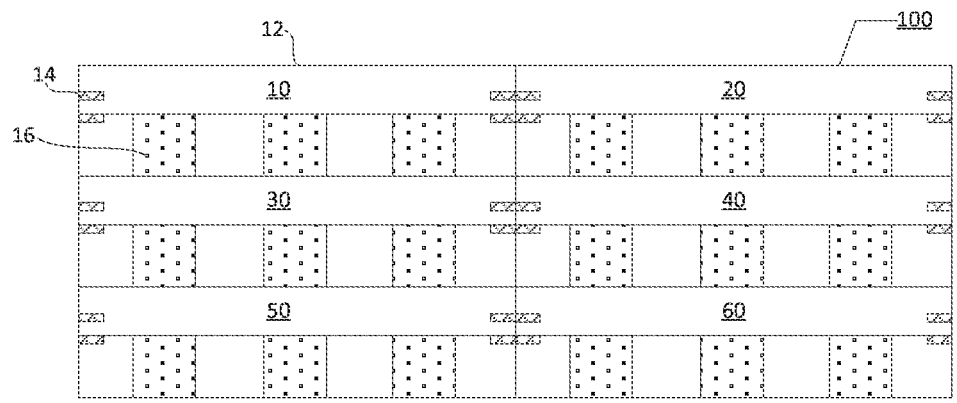
FIG. 1 is a schematic structural diagram of a collision machine in an embodiment of the present application.

Description of following embodiment, with reference to accompanying drawings, is used to exemplify specific embodiments which may be carried out in the present disclosure. Directional terms mentioned in the present disclosure, such as "top", "bottom", "front", "back", "left", "right", "inside", "outside", "side", etc., are only used with reference to orientation of the accompanying drawings. Therefore, the directional terms are intended to illustrate, but not to limit, the present disclosure. In the drawings, components having similar structures are denoted by same numerals.

The present application will be described in detail below with reference to the accompanying drawings.

First, referring to FIG. 1, FIG. 1 is a schematic structural diagram of a collision machine 100 in an embodiment of the present application. The collision machine 100 includes at least two collision units. In the present embodiment, the collision machine 100 includes a first collision unit 10, a second collision unit 20, a third collision unit 30, a fourth collision unit 40, a fifth collision unit 50, and a sixth collision unit 60. The above six collision units are set with a same structure. In other embodiments, the number of collision units can be set as desired.

Figure 2:
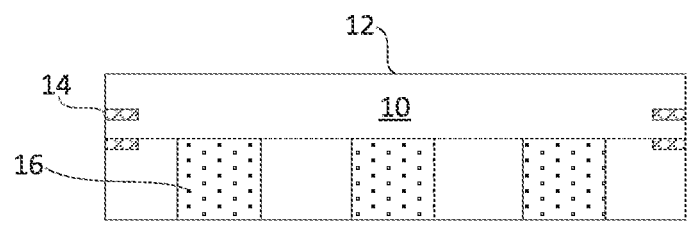
FIG. 2 is a schematic structural diagram of a collision unit in the collision machine of FIG. 1.

Referring to FIG. 2, FIG. 2 is a schematic structural diagram of the first collision unit 10 in the collision machine of FIG. 1. The collision unit 10 includes a housing 12, support structures 14, and at least two collision bodies 16. The support structures 14 are located on two opposite surfaces of the housing 12 for fixing a liquid crystal panel. The collision bodies 16 are located below the support structures, and top surfaces of the collision bodies are in contact with a display surface of the liquid crystal panel for applying repeated impacts to the liquid crystal panel to generate bubbles in the liquid crystal panel by the repeated impacts.

In the present embodiment, the housing 12 is a cubic structure having a cavity, the cubic structure has an opening in a vertical surface thereof, a movable cover corresponding to the opening is disposed at the opening, and wherein the surface of the cubic structure in a horizontal direction is a detecting surface, and a length and a width of the detecting surface are greater than a length and a width of the liquid crystal panel, respectively.

In the present embodiment, two opposite surfaces of the cubic structure perpendicular to the opening and the detecting surface are supporting surfaces for setting the supporting structure 14. The support structures 14 are double-layered protrusion structures symmetrically disposed on each of the supporting surfaces, the distance between a top protrusion and a bottom protrusion of the double-layered protrusion structure is equal to a thickness of the liquid crystal panel.

Figure 3:
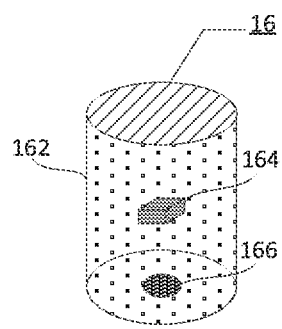
FIG. 3 is a schematic structural diagram of a collision body in the collision unit of FIG. 2.

Referring to FIG. 3, each of the collision bodies 16 includes a closed casing 162, a collision body 164 located inside the casing and a driving device 166 for generating the repeated impacts.

In an embodiment of the present application, the driving device 166 is an ultrasonic generator. Specifically, the ultrasonic generator is located at a bottom of the casing 162 and is capable of accepting a collision signal emitted by the collision machine, and wherein after receiving the collision signal, the ultrasonic generator emits ultrasonic waves, and the collision bodies are driven upward by ultrasonic waves to strike a top of the casing. The ultrasonic waves have a periodically repeating frequency capable of driving the collision bodies to periodically reciprocate in a vertical direction, causing the collision body to periodically repeatedly strike the top of the casing.

In another embodiment of the present application, the collision body 164 is a magnetic collision body and the drive device 166 is a magnetic field generator. The magnetic field generator is a toroidal coil distributed on the top, bottom and side walls of the casing, the magnetic collision body is located inside the toroidal coil, and the magnetic field generator is capable of accepting a collision signal emitted by the collision machine, and wherein after receiving the collision signal, the magnetic field generator generates a certain frequency of alternating current inside the toroidal coil to form a magnetic field inside the coil, and the collision body 164 is driven upward by the magnetic field to strike the top of the casing.

The magnetic field generated by the magnetic field generator has a periodically changing magnetic field direction, the change in the direction of the magnetic field drives the magnetic collision body to periodically reciprocate in a vertical direction, causing the collision body to periodically and repeatedly strike the top of the casing.

Figure 4:
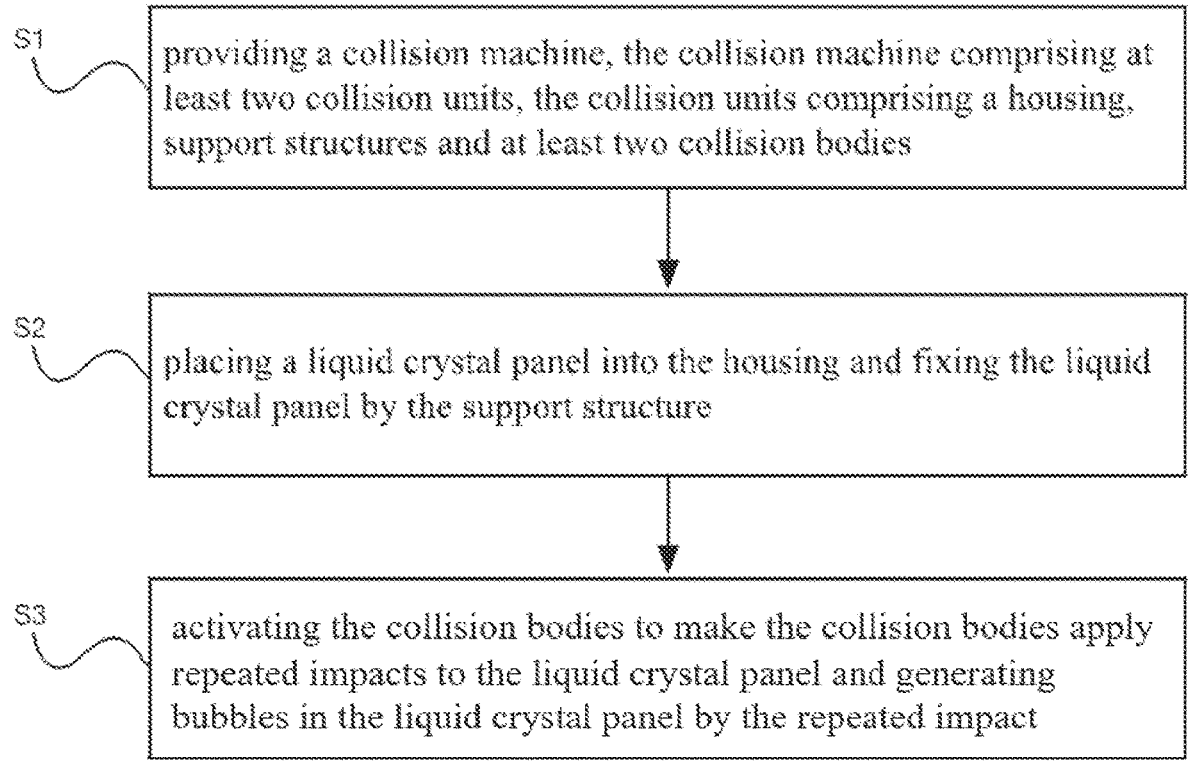
FIG. 4 is a schematic flow chart of a method for generating bubbles in a liquid crystal panel according to an embodiment of the present application.

Referring to FIG. 4, the present application further provides a method of simulating collision, comprising the steps of:

S1, providing a collision machine, the collision machine comprising at least two collision units, the collision units comprising a housing, support structures and at least two collision bodies; wherein the support structures are located on two opposite surfaces of the housing for fixing a liquid crystal panel, and wherein the collision bodies are located below the support structures, and top surfaces of the collision bodies are in contact with a display surface of the liquid crystal panel;

S2, placing a liquid crystal panel into the housing and fixing the liquid crystal panel by the support structure;

S3, activating the collision bodies to make the collision bodies to apply repeated impacts to the liquid crystal panel and generating bubbles in the liquid crystal panel by the repeated impact.

First, in step S1, the collision machine 100 includes at least two collision units. In the present embodiment, the collision machine 100 includes a first collision unit 10, a second collision unit 20, a third collision unit 30, a fourth collision unit 40, a fifth collision unit 50, and a sixth collision unit 60. The above six collision units are set with a same structure. In other embodiments, the number of collision units can be set as desired.

Referring to FIG. 2, FIG. 2 is a schematic structural diagram of the first collision unit 10 in the collision machine of FIG. 1. The collision unit 10 includes a housing 12, support structures 14, and at least two collision bodies 16. The support structures 14 are located on two opposite surfaces of the casing 12 for fixing a liquid crystal panel. The collision bodies 16 are located below the support structures, and top surfaces of the collision bodies are in contact with a display surface of the liquid crystal panel for applying repeated impacts to the liquid crystal panel to generate bubbles in the liquid crystal panel by the repeated impacts.

Thereafter, in step S2, placing a liquid crystal panel into the housing and fixing the liquid crystal panel by the support structure.

In the present embodiment, the housing 12 is a cubic structure having a cavity, the cubic structure has an opening in a vertical surface thereof, a movable cover corresponding to the opening is disposed at the opening, and wherein the surface of the cubic structure in a horizontal direction is a detecting surface, and a length and a width of the detecting surface are greater than a length and a width of the liquid crystal panel, respectively.

In the present embodiment, two opposite surfaces of the cubic structure perpendicular to the opening and the detecting surface are supporting surfaces for setting the supporting structure 14. The support structures 14 are double-layered protrusion structures symmetrically disposed on each of the supporting surfaces, the distance between a top protrusion and a bottom protrusion of the double-layered protrusion structure is equal to a thickness of the liquid crystal panel.

Last, in step S3, activating the collision bodies to make the collision bodies to apply repeated impacts to the liquid crystal panel and generating bubbles in the liquid crystal panel by the repeated impact.

Referring to FIG. 3, each of the collision bodies 16 includes a closed casing 162, a collision body 164 located inside the casing and a driving device 166 for generating the repeated impacts.

In an embodiment of the present application, the driving device 166 is an ultrasonic generator. Specifically, the ultrasonic generator is located at a bottom of the casing 162 and is capable of accepting a collision signal emitted by the collision machine, and wherein after receiving the collision signal, the ultrasonic generator emits ultrasonic waves, and the collision bodies are driven upward by ultrasonic waves to strike a top of the casing. The ultrasonic waves have a periodically repeating frequency capable of driving the collision bodies to periodically reciprocate in a vertical direction, causing the collision body to periodically repeatedly strike the top of the casing.

In another embodiment of the present application, the collision body 164 is a magnetic collision body and the drive device 166 is a magnetic field generator. The magnetic field generator is a toroidal coil distributed on the top, bottom and side walls of the casing, the magnetic collision body is located inside the toroidal coil, and the magnetic field generator is capable of accepting a collision signal emitted by the collision machine, and wherein after receiving the collision signal, the magnetic field generator generates a certain frequency of alternating current inside the toroidal coil to form a magnetic field inside the coil, and the collision body 164 is driven upward by the magnetic field to strike the top of the casing.

The magnetic field generated by the magnetic field generator has a periodically changing magnetic field direction, the change in the direction of the magnetic field drives the magnetic collision body to periodically reciprocate in a vertical direction, causing the collision body to periodically and repeatedly strike the top of the casing.

The present application can simulate external impacts by the collision bodies and generate liquid crystal bubbles in the liquid crystal display, so that the impact test of the liquid crystal panel can be completed before shipping and help the producers evaluate and optimize the quality of the liquid crystal panels according to the results of the impact test. In addition, the present application provides at least two collision units, which can perform impact test on two or more panels at the same time, further improving the test efficiency.

As is understood by persons skilled in the art, the foregoing preferred embodiments of the present disclosure are illustrative rather than limiting of the present disclosure. It is intended that they cover various modifications and that similar arrangements be included in the spirit and scope of the present disclosure, the scope of which should be accorded the broadest interpretation so as to encompass all such modifications and similar structures.

What is claimed is:

1. A collision machine for simulating collisions, comprising at least two collision units, each of the collision units comprising a housing, support structures, and at least two collision bodies; wherein
    the support structures are located on two opposite surfaces of the housing for fixing a liquid crystal panel;
    the collision bodies are located below the support structures, and top surfaces of the collision bodies are in contact with a display surface of the liquid crystal panel for applying repeated impacts to the liquid crystal panel to generate bubbles in the liquid crystal panel by the repeated impacts;
    each the collision bodies comprises a closed casing, a collision block located inside the casing, and a driving device for generating the repeated impacts,
    wherein the support structures are double-layered protrusion structures symmetrically disposed on each of the two opposite surfaces, the distance between a top protrusion and a bottom protrusion of the double-layered protrusion structure is equal to the thickness of the liquid crystal panel.

2. The collision machine according to claim 1, wherein the housing is a cubic structure having a cavity, the cubic structure has an opening in a vertical surface thereof, a movable cover corresponding to the opening is disposed at the opening, and wherein the surface of the cubic structure in a horizontal direction is a detecting surface, and a length and a width of the detecting surface are greater than a length and a width of the liquid crystal panel, respectively.

3. The collision machine according to claim 2, wherein two opposite surfaces of the cubic structure perpendicular to the opening and the detecting surface are supporting surfaces for setting the support structures.

4. The collision machine according to claim 1, wherein the driving device is an ultrasonic generator.

5. The collision machine according to claim 4, wherein the ultrasonic generator is located at a bottom of the casing and is capable of accepting a collision signal emitted by the collision machine, and wherein after receiving the collision signal, the ultrasonic generator emits ultrasonic waves, and the collision bodies are driven upward by ultrasonic waves to strike a top of the casing.

6. The collision machine according to claim 5, wherein the ultrasonic waves have a periodically repeating frequency capable of driving the collision bodies to periodically reciprocate in a vertical direction, causing the collision block to periodically repeatedly strike the top of the casing.

7. The collision machine according to claim 1, wherein the collision block is a magnetic collision block and the drive device is a magnetic field generator.

8. The collision machine according to claim 7, wherein the magnetic field generator is a toroidal coil distributed on the top, bottom, and side walls of the casing, the magnetic collision block is located inside the toroidal coil, and the magnetic field generator is capable of accepting a collision signal emitted by the collision machine, and wherein after receiving the collision signal, the magnetic field generator generates a certain frequency of alternating current inside the toroidal coil to form a magnetic field inside the coil, and the collision block is driven upward by the magnetic field to strike the top of the casing.

9. The collision machine according to claim 8, wherein the magnetic field generated by the magnetic field generator has a periodically changing magnetic field direction, the change in the direction of the magnetic field drives the magnetic collision block to periodically reciprocate in a vertical direction, causing the collision block to periodically and repeatedly strike the top of the casing.

10. A collision machine for simulating collisions, comprising at least two collision units, the collision units comprising a housing, support structures, and at least two collision bodies; wherein
    the support structures are located on two opposite surfaces of the housing for fixing a liquid crystal panel;
    the collision bodies are located below the support structures, and top surfaces of the collision bodies are in contact with a display surface of the liquid crystal panel for applying repeated impacts to the liquid crystal panel to generate bubbles in the liquid crystal panel by the repeated impacts,
    wherein the support structures are double-layered protrusion structures symmetrically disposed on each of the supporting surfaces, a distance between a top protrusion and a bottom protrusion of the double-layered protrusion structure is equal to a thickness of the liquid crystal panel.

11. The collision machine according to claim 10, wherein the housing is a cubic structure having a cavity, the cubic structure has an opening in a vertical surface thereof, a movable cover corresponding to the opening is disposed at the opening, and wherein the surface of the cubic structure in a horizontal direction is a detecting surface, and a length and a width of the detecting surface are greater than a length and a width of the liquid crystal panel, respectively.

12. The collision machine according to claim 11, wherein two opposite surfaces of the cubic structure perpendicular to the opening and the detecting surface are supporting surfaces for setting the support structures.

13. The collision machine according to claim 12, wherein each of the collision bodies comprises a closed casing, a collision block located inside the casing, and a driving device for generating the repeated impacts.

14. The collision machine according to claim 13, wherein the driving device is an ultrasonic generator.

15. The collision machine according to claim 14, wherein the ultrasonic generator is located at a bottom of the casing and is capable of accepting a collision signal emitted by the collision machine, and wherein after receiving the collision signal, the ultrasonic generator emits ultrasonic waves, and the collision bodies are driven upward by ultrasonic waves to strike a top of the casing.

16. The collision machine according to claim 15, wherein the ultrasonic waves have a periodically repeating frequency capable of driving the collision bodies to periodically reciprocate in a vertical direction, causing the collision block to periodically repeatedly strike the top of the casing.

17. The collision machine according to claim 13, wherein the collision block is a magnetic collision block and the drive device is a magnetic field generator.

18. The collision machine according to claim 17, wherein the magnetic field generator is a toroidal coil distributed on the top, bottom and side walls of the casing, the magnetic collision block is located inside the toroidal coil, and the magnetic field generator is capable of accepting a collision signal emitted by the collision machine, and wherein after receiving the collision signal, the magnetic field generator generates a certain frequency of alternating current inside the toroidal coil to form a magnetic field inside the coil, and the collision block is driven upward by the magnetic field to strike the top of the casing.

19. The collision machine according to claim 18, wherein the magnetic field generated by the magnetic field generator has a periodically changing magnetic field direction, the change in the direction of the magnetic field drives the magnetic collision block to periodically reciprocate in a vertical direction, causing the collision block to periodically and repeatedly strike the top of the casing.

20. A method of simulating collision, comprising the steps of:
- S1, providing a collision machine, the collision machine comprising at least two collision units, the collision units comprising a housing, support structures, and at least two collision bodies; wherein the support structures are located on two opposite surfaces of the housing for fixing a liquid crystal panel, and wherein the collision bodies are located below the support structures, and top surfaces of the collision bodies are in contact with a display surface of the liquid crystal panel;
- S2, placing the liquid crystal panel into the housing and fixing the liquid crystal panel by the support structure, wherein the support structures are double-layered protrusion structures symmetrically disposed on each of the two opposite surfaces, the distance between a top protrusion and a bottom protrusion of the double-layered protrusion structure is equal to the thickness of the liquid crystal panel;
- S3, activating the collision bodies to make the collision bodies to apply repeated impacts to the liquid crystal panel and generating bubbles in the liquid crystal panel by the repeated impact.

* * * * *